United States Patent [19]

Lusignan et al.

[11] Patent Number: 4,489,222

[45] Date of Patent: Dec. 18, 1984

[54] TELEPHONE LINE INTERFACE

[75] Inventors: Bruce B. Lusignan; Hamid Najafi, both of Palo Alto, Calif.

[73] Assignee: The Board of Trustees of the Leland Stanford, Junior University, Palo Alto, Calif.

[21] Appl. No.: 417,638

[22] Filed: Sep. 13, 1982

[51] Int. Cl.$^3$ .......................... H03K 7/08; H04B 3/20
[52] U.S. Cl. ................................ 177/170.2; 179/81 R; 330/10; 375/8; 375/22
[58] Field of Search ................. 179/3, 4, 17 E, 170.2, 179/81 R, 81 A, 81 B, 170 R, 170 NC, 170 T, 170.6, 2 C, 2 R; 330/10, 207 A; 332/9 R; 375/7, 8, 22

[56] References Cited

U.S. PATENT DOCUMENTS

| | | |
|---|---|---|
| 3,471,651 | 10/1969 | Saia et al. ............................ 179/84 A |
| 3,965,447 | 6/1976 | Thomas ................................ 330/107 |
| 4,317,964 | 3/1982 | Biggs et al. ............................ 179/81 R |
| 4,337,438 | 6/1982 | Guggenbühl et al. ................. 330/10 |

Primary Examiner—Benedict V. Safourek
Attorney, Agent, or Firm—Flehr, Hohbach, Test, Albritton & Herbert

[57] ABSTRACT

A telephone line interface which performs the BORSHT functions employs pulse width modulation and eliminates dc in the transformer to reduce the size of the coupling transformer thereby reducing space and costs. The ring function is provided to the subscriber without use of mechanical relays. An automatic, dynamically adjusted hybrid network is provided for removing echo signals thereby providing major improvement in two-to-four wire conversion performance. The circuitry lends itself to large scale integration thereby reducing space and cost and improving reliability.

12 Claims, 7 Drawing Figures

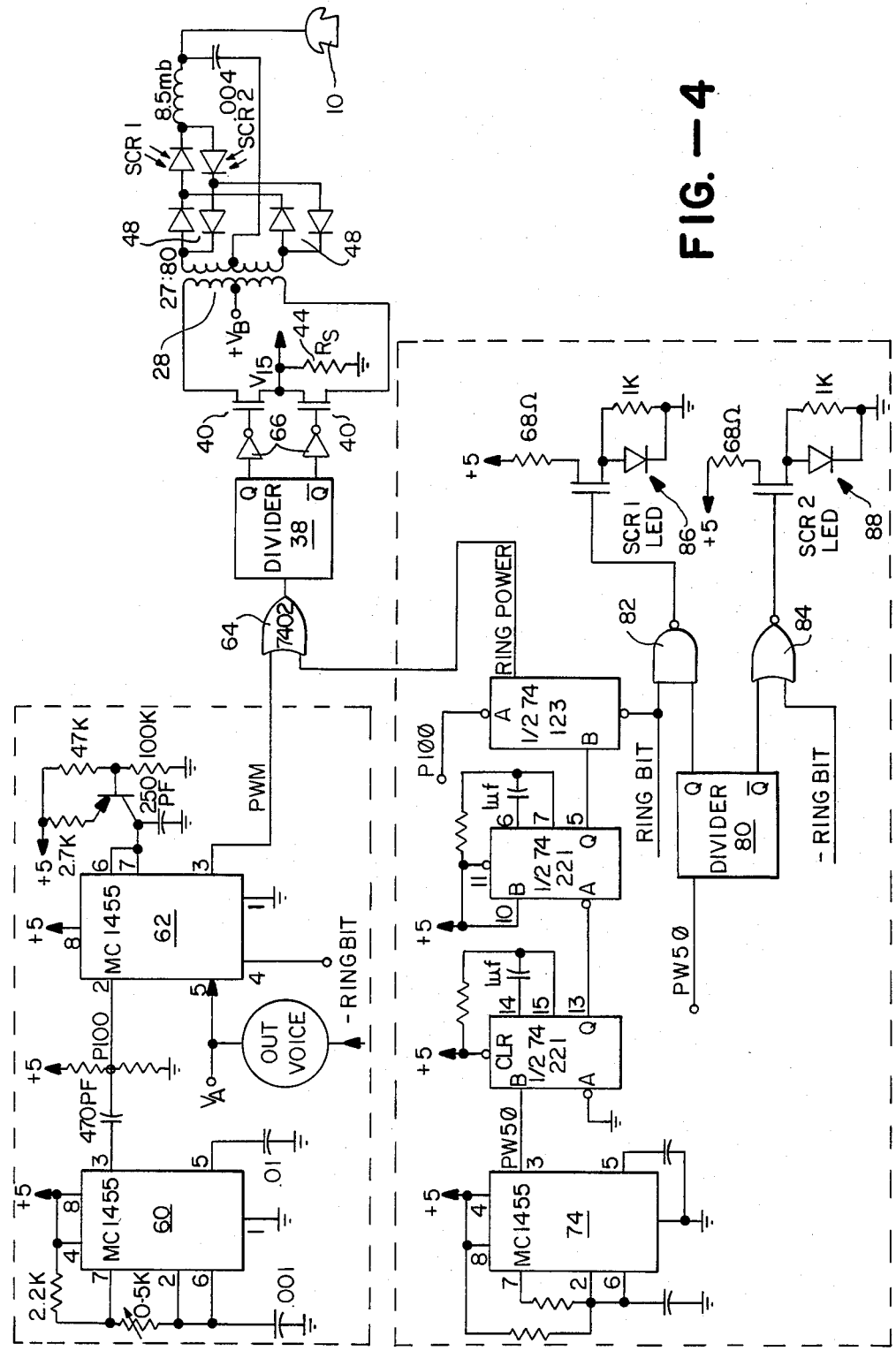
FIG.—4

TELEPHONE LINE INTERFACE

This invention relates generally to telephone switches for interconnecting telephone subscribers, and more particularly the invention relates to a new and improved line interface unit.

Telephone subscribers are interconnected by two wire loop circuitry to a central switching exchange center from where incoming and outgoing signals are carried on four wire trunks. Long haul four wire trunks are eventually returned to a two wire subscriber loop. The two wire to four wire conversion is accomplished by a subscriber line interface at the switch.

The line interface performs what is referred to as BORSHT functions: battery power, over voltage protection, ringing, signalling, hybrid (2-4 wire conversion), and testing. Heretofore, the subscriber line interface for performing all of these functions have been expensive and bulky. A hybrid transformer has been necessary for the 2-4 wire conversion and for overvoltage protection. Additionally, mechanical relays have been used to connect and disconnect the high voltage ringing signal, which adds to the size and cost of the interface. Further, the mechanical nature of the relays causes reliability problems.

Accordingly, an object of the present invention is an improved telephone subscriber line interface circuit.

Another object of the invention is a subscriber line interface which is smaller, more economical, and more reliable.

Briefly, in accordance with the invention the size of the transformer in the subscriber line interface is reduced by employing pulse width modulation in the interface. Further, the interface circuitry lends itself to VLSI technology thus reducing size and cost while improving reliability. Additionally, the line interface circuitry improves overall reliability by eliminating ringing relays and providing the ringing voltage directly from the electronic circuit through the small isolating transformer to the telephone receiver. Dynamic balancing is employed to improve transmission quality by reducing echoes encountered in long distance calls.

The invention and objects and features thereof will be more readily apparent from the following detailed description and appended claims when taken with the drawing, in which:

FIG. 4 is a detailed schematic for outgoing signal circuitry in the interface unit of FIG. 3.

Figure 1:
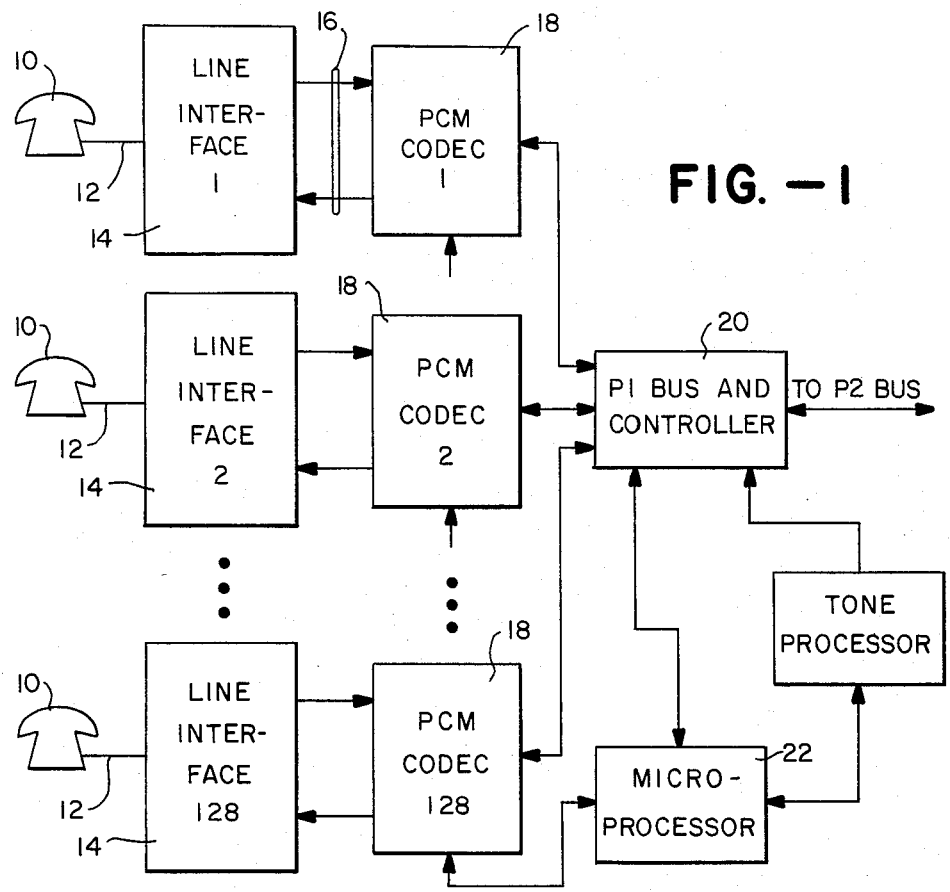
FIG. 1 is a functional block diagram of a central switch exchange.

Referring now to the drawings, FIG. 1 is a functional block diagram of a central switch exchange in which the present invention is used. A plurality of telephone users 10 are interconnected through two wire loops 12 to line interface units 14 in the switch. Each interface unit is interconnected by four wires 16 (e.g. two wires for signal transmission and two wires for signal reception) to PCM Codec units 18. The units 18 convert audio analog signals from the interface unit 14 to a pulse code digital format, and the digital signals from the PCM Codec units are then multiplexed on a P1 bus. Conversely, digital signals from the P1 bus 20 are received by the PCM Codec units 18 and converted to analog audio signals for application to the line interface unit 14. The P1 bus is an eight bit wide time division multiplex PCM databus. The P1 bus and the PCM Codec units are controlled by a microprocessor 22 at the switch.

Figure 2:
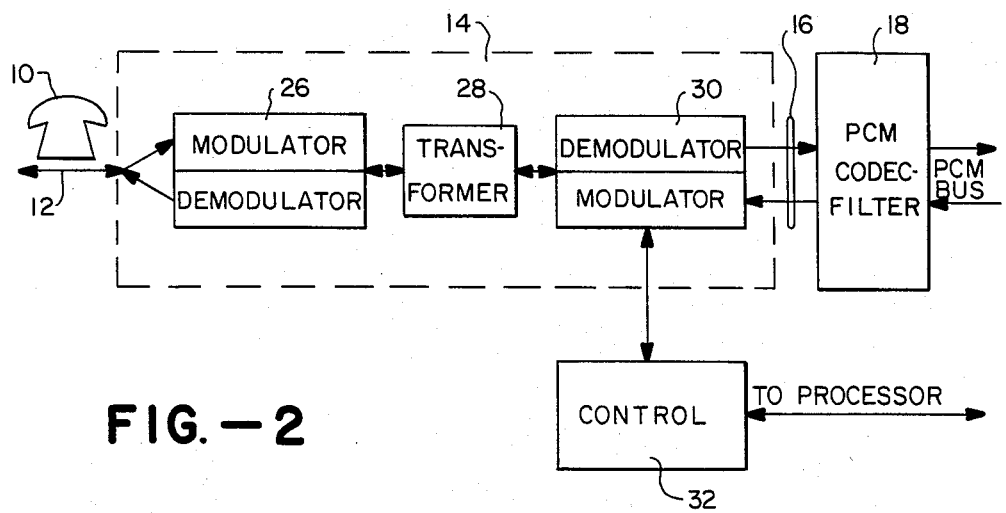
FIG. 2 is a generalized functional block diagram of a line interface unit in the exchange of FIG. 1.

The line interface units 14 perform the BORSHT functions described above. FIG. 2 is a functional block diagram of a line interface unit in accordance with the invention in which the analog audio signals from the subscriber's telephone 10 are modulated and demodulated within the line interface unit 12. Analog signals from the telephone are modulated by a modem 26 and a high frequency signal is then transferred through coupling transformer 28 to a second modem 30 which demodulates the signal and applies the audio analog signal to PCM Codec unit 18. Conversely, analog audio signals from the PCM Codec unit 18 are modulated by modem 30, transferred through coupling transformer 28, and demodulated by modem 26 and applied as audio analog signals to the two wire loop 12 and the telephone 10. Further, the circuitry lends itself to VLSI circuit technology, thus reducing size and cost and improving reliability. The control circuitry 32 communicates with the microprocessor at the switch for the exchange of information such as line status and ringing command.

By modulating the analog signals the size of transformer 28 can be reduced and the BORSHT functions can be more reliably implemented.

Figure 3:
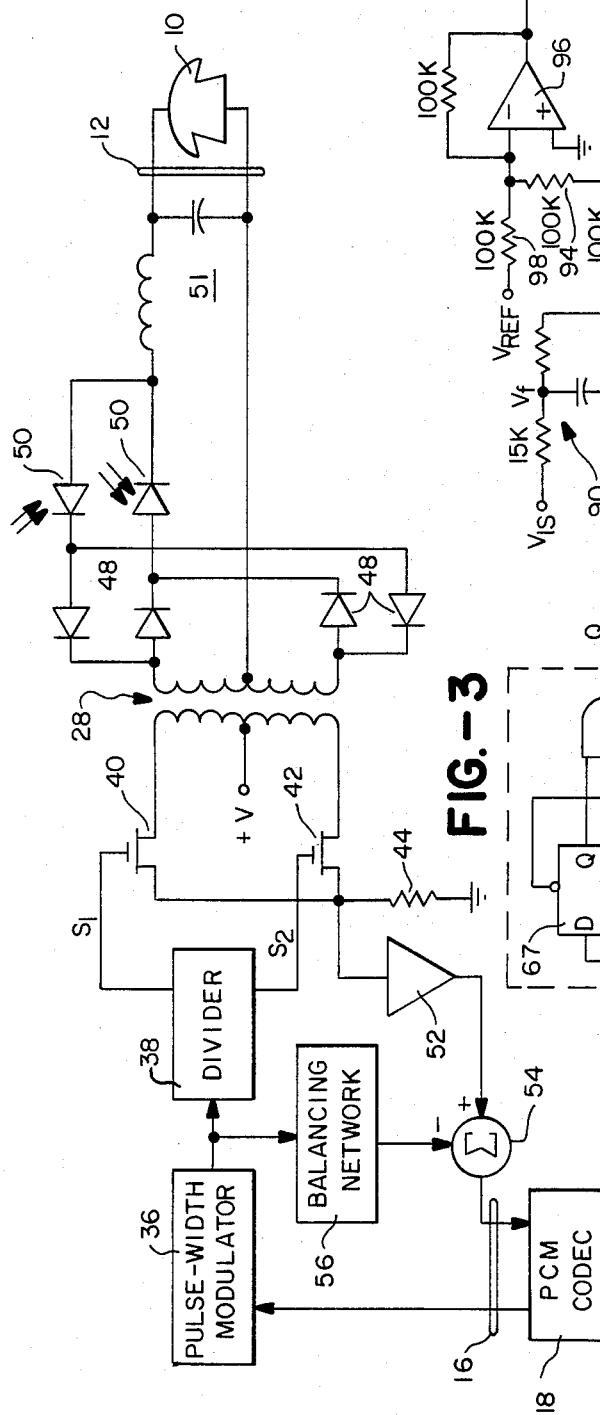
FIG. 3 is an electrical schematic of a line interface unit in accordance with one embodiment of the present invention.

FIG. 3 is a schematic of one embodiment of a line interface illustrated in FIG. 2. The voice signals from the PCM Codec unit 18 and destined for the subscriber set 10 are applied to pulse width modulator 36 which modulates a high frequency carrier with the voice signals. The modulated signal is divided in divider 38, and the two divided signals S1 and S2 are applied to switch transistors 40 and 42 connected to the primary winding of transformer 28. The center tap of the primary winding is connected to a voltage source, +V. The alternating conduction of transistors 40 and 42 generates a high frequency pulse train with no dc value and in which the duty cycle varies with the voice frequency. The pulse train is transmitted by transformer 28 and generates voltage across sense resistor 44.

Advantageously, the absence of a dc value prevents the transformer core from saturating before full use of the transformer maximum flux density is made by the transmitted signal. Since the size of the core tends to decrease as the frequency of the signals increases, the high frequency modulated signal requires a very small ferrite core while a conventional transformer for a voice frequency signal needs a substantially larger core. Further, the high frequency pulse train provides line power to the receiver 10 through the full wave rectifier comprising diodes 48 which are connected to the secondary winding of transformer 28. The photo SCRs 50 which connect the bridge through lowpass filter 51 to the loop 12 are used for ringing and testing, as will be described further hereinbelow. Since the subscriber loop 12 is floating and has no common ground with the electronic circuits of the switch, full isolation of the switch from the outside loop is provided, thus protecting the switch from high voltages caused by lightning and power line crossing.

A signal coming from the subscriber 10 modulates the resistance of the telephone set's microphone, and the resulting audio signal amplitude modulates the voltage across sense resistor 44 connected between transistors 40, 42 and circuit ground.

The voltage across sense resistor 44 is applied through amplifier 52 to differential amplifier 54. Any echo signal from the pulse width modulator 36 is applied through a balancing network 54 and subtracted from the detected signal in amplifier 54. The output of the amplifier 54 is then filtered and applied as an input to the PCM unit 18. Importantly, the balancing network 56 simulates the subscriber loop impedance transformation through the pulse width modulator in order to avoid echos of the signal to the telephone 10 being heard by the other transmitting party after a round trip delay of the signal. As will be described further hereinbelow with reference to FIG. 7, the balancing network comprises a combination of one capacitor and two dynamically adjustable resistors to simulate the impedance of the subscriber loop.

When the switch processor demands ringing of the receiver 10, circuitry is provided to control switches 40 and 42 and increase the duty cycle to nearly 100%. The circuitry also controls the photodiodes 54 to provide a 25 Hertz, or other ringing frequency, pulse for ringing. As will be described further hereinbelow, line status detection is achieved by comparing the voltage across the sense resistor 44 with a reference voltage.

Figure 6:
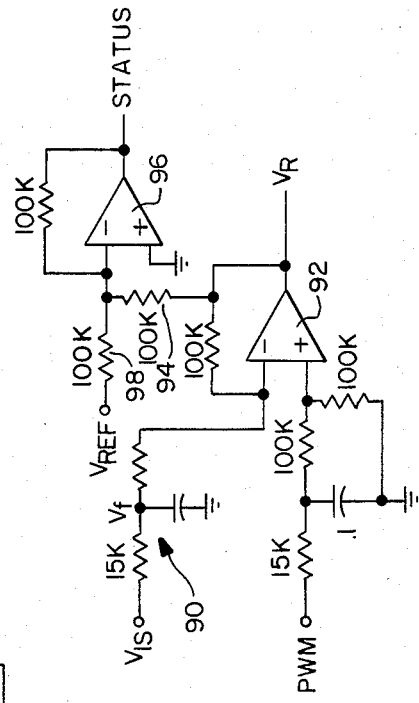
FIG. 6 is an electrical schematic of additional circuitry for generating signals used in the circuitry of FIG. 4.
Figure 5:
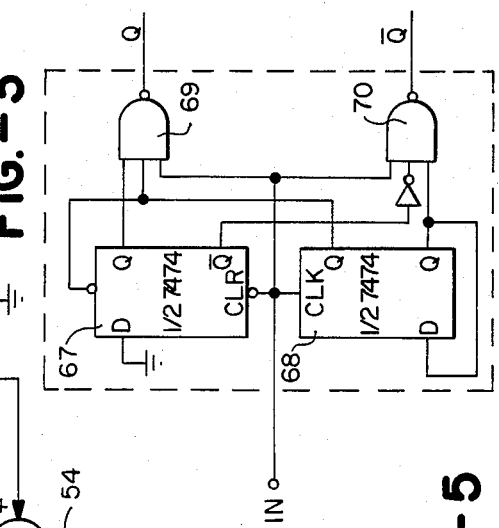
FIG. 5 is a schematic of a divider used in the circuitry of FIG. 4.
Figure 7:
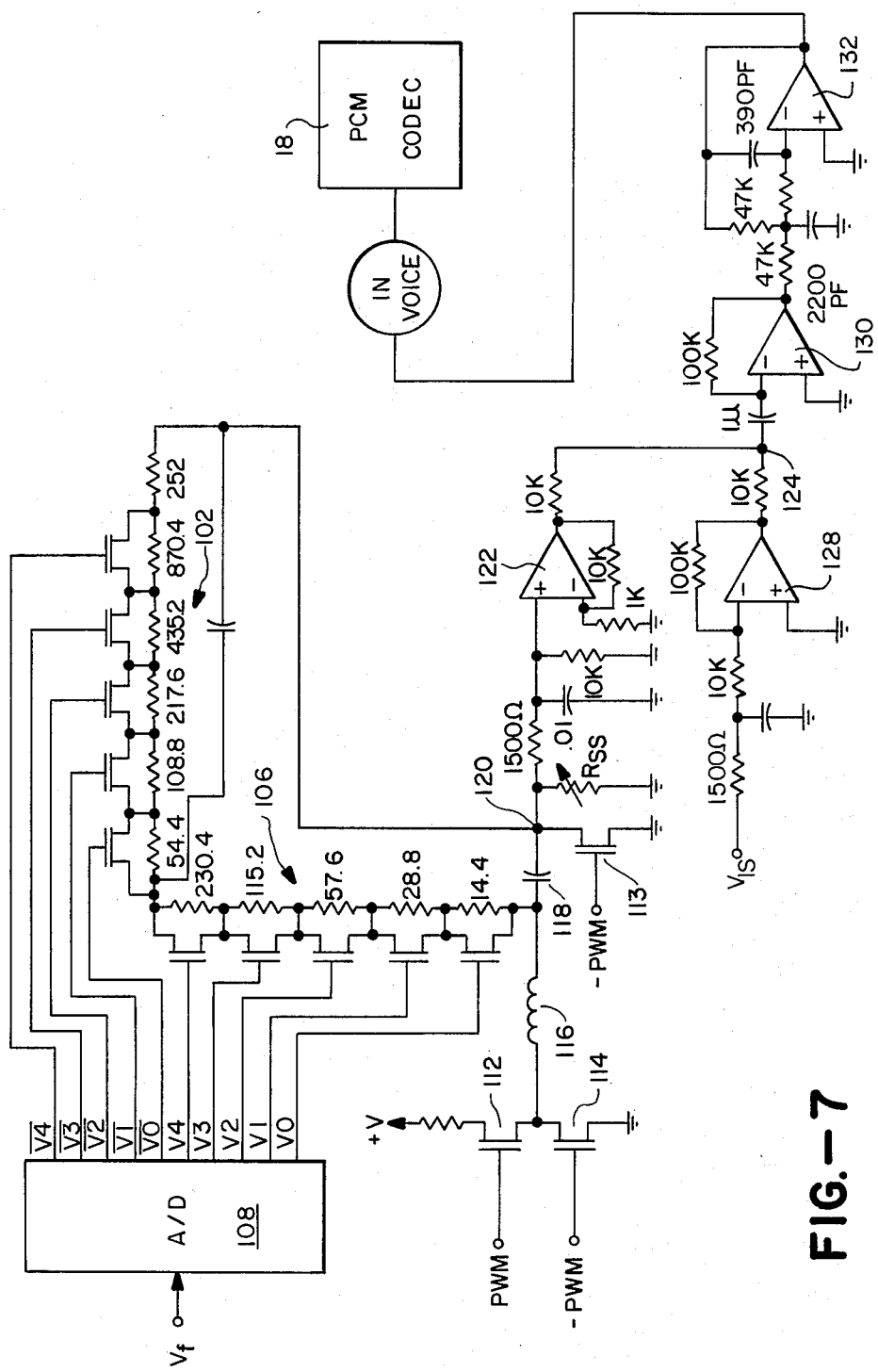
FIG. 7 is an electrical schematic of incoming signal circuitry in the line interface unit of FIG. 3.

Consider now FIGS. 4, 5, 6 and 7 which are detailed schematics of the circuitry illustrated in FIG. 3. The circuitry for an outgoing signal from the switch to the subscriber is illustrated in FIGS. 4, 5, and 6 and the circuitry for the incoming signal from the subscriber to the switch is illustrated in FIG. 7. Referring now to FIG. 4, the outgoing voice on line 16 is applied to the pulse width modulator 36 which includes two 100K hertz timers 60 and 62. The output of modulator 36 is a 100Khz signal designated PWM which is pulse width modulated by the audio signal on line 16. The disable terminal of timer 62 is connected to a RING bit line from the switch processor whereby the modulator is controlled during the ring command.

The PWM signal is applied through an OR gate 64 to the divider 38 and thence through buffers 66 to the gate terminals of transistors 40 and 42. Divider 38 is conventional circuitry as illustrated in FIG. 5 wherein the 100 Hz input signal drives flip-flops 67 and 68 which in turn are interconnected with NAND gate 69 and 70 which generate 50K hertz signals Q and $\bar{Q}$ for driving transistors 40 and 42, respectively.

Ring circuitry 72 responds to a RING bit signal from the switch processor and provides a ring signal through OR gate 64 to control switches 40 and 42 at nearly 100% duty cycle. The circuitry includes a 50 Hertz timer 74 which drives cascaded flip-flops 75, 76 and 77. The 50 hertz signal is also applied to a divider 80 (similar to the divider in FIG. 5), and the 25 Hertz signals from divider 80 are applied to NAND gate 82 and NOR gate 84 along with the RING bit and - RING bit, respectively, which in turn drive light emitting diodes 86 and 88. The light emitting diodes 86 and 88 in turn control the photo SCR devices 50 whereby a 25 Hertz signal is applied to ring the telephone receiver 10.

Constant current control and status detection is accomplished by the circuit illustrated in FIG. 6. The voltage across the sense resistor 48, designated $V_{Is}$, is applied through a low pass filter 90, and the filtered signal ($V_f$) is applied to one input of comparator 92. The other input to comparator 92 is the pulse width modulation (PWM) signal from modulator 36. The output of comparator 92, designated $V_R$, is applied through resistor 94 to one input of differential amplifier 96. A reference voltage, $V_{ref}$, is also applied through resistor 98 to the input of amplifier 96. When $v_r$ is greater than $V_{ref}$ then an ON HOOK status is indicated. When $V_r$ is less than $V_{ref}$ then an OFF HOOK is indicated.

FIG. 7 is hybrid circuitry for balancing an incoming signal from the subscriber 10 to the central switch. As above indicated, the subscriber line simulation is accomplished by a three component network consisting of a variable resistor 102, a shunt capacitor 104, and a series variable resistor 106. The signal $V_f$, obtained in the circuitry of FIG. 6 by low pass filtering the voltage $V_{Is}$ across the sense resistor 44, is applied to control an analog to digital converter 108. The output of the converter 108 controls the conductance of transistors bridging the resistive elements in variable resistors 102 and 106 in accordance with the required echo suppression. The modulated echo signal PWM and complement, $\overline{PWM}$, control the voltage applied by transistors 112 and 114 through inductor 116 and capacitor 118 to junction 120 and the voltage applied by transistor 113 to junction 120. Resistor $R_{ss}$ at junction 120 simulates the sense resistor 44. The three component network provides the requisite line impedance simulation for balance of the PWM signal for echo cancellation. The signal at junction 120, across $R_{ss}$, is then the adjusted echo signal which is applied through amplifier 122 to the junction 124.

Operation of transistors 112, 113, and 114 in establishing voltage across resistor $R_{ss}$ simulate the effect of the PWM pulses across the sense resistor 114. When the pulse is present transistor 112 applies a voltage to terminal 120. When the pulse is absent, transistor 113 removes voltage at terminal 120 and simulates the diode short seen by the telephone user. The impedance network including resistors 107 and 106 and capacitor 104 simulate the driving impedance of the modulator-demodulator 26.

The voltage $V_{Is}$, which includes both the subscriber and echo signals, is applied through a passive low pass filter 127 to amplifier 128 and thence to the terminal 124. The echo signal from amplifier 122 is then subtracted from the subscriber and echo signal from amplifier 128 thereby leaving only the subscriber signal at terminal 124. The incoming subscriber signal is then applied through amplifier 130 and the active low pass filter 132 to PCM Codec 18.

In the test mode the photo SCRs 50 can be opened to isolate the subscriber for measuring the impedance of the subscriber and two wire loop. Alternatively, the photodiodes can be closed to short the transformer 28 whereupon the line interface circuit can be tested.

The described line interface circuit is small, economical, and reliable. The switch is isolated from the subscriber loop for overvoltage protection. The ringing function is readily implemented without the need for mechanical relays. The other BORSHT including testing, battery power, signalling and 2-4 wire conversion are readily implemented, also.

While the invention has been described with reference to a specific embodiment, the description is illustrative of the invention and is not to be construed as limiting the invention. Various modifications and applications may occur to those skilled in the art without departing from the true spirit and scope of the invention as defined by the appended claims.

What is claimed is:

1. A telephone line interface for receiving and transmitting audio analog signals between a switch and a subscriber telephone comprising a two wire terminal for receiving and for transmitting an audio frequency signal, first modulator means connected to said two wire terminal for modulating a carrier signal with a received audio signal, transformer means including first and second coupled windings for magnetically coupling the modulated carrier signal, demodulator means for demodulating the magnetically coupled modulated carrier signal, means for transmitting the demodulated signal, and hybrid means for simulating a pulse width modulated carrier signal modulated by an audio analog signal transmitted from said switch, said hybrid means removing said pulse width modulated signal as an echo from a signal transmitted from said subscriber telephone to said switch.

2. The line interface as defined by claim 1 wherein said first modulator means comprises a pulse width modulator.

3. The line interface as defined by claim 2 wherein said pulse width modulator includes a sense resistor and first and second switch means connecting end terminals of said first winding through said sense resistor to one voltage potential, a second voltage potential connected to a center tap of said first winding, said first and second switch means being alternately controlled by said modulated carrier signal.

4. The line interface as defined by claim 3 wherein said demodulator comprises a full wave diode bridge connected to end terminals of said second winding and a low pass filter connecting said bridge to a subscriber loop.

5. The line interface as defined by claim 4 wherein said end terminals of said second winding are connected to said full wave bridge and through said low-pass LC filter to one subscriber line.

6. The line interface as defined by claim 1 wherein said hybrid means comprises a balancing network for simulating the impedance of said subscriber loop, said simulator including a capacitor connected in parallel with a first variable resistor and a second variable resistor serially connected with said capacitor and first variable resistor, said variable resistors being controlled to simulate the impedance of said subscriber loop.

7. The line interface as defined by claim 6 and further including resistive means for simulating said sense resistor, and switch means driven by said pulse width modulator for applying voltage pulses across said resistive means.

8. The line interface as defined by claim 7 wherein said switch means comprises first and second serially connected transistors connected between two voltage potentials, said first and second transistors being alternately controlled by said pulse width modulated carrier signal, a third transistor connected in parallel with said resistive means, said third transistor being controlled by said pulse width modulated carrier signal and means including said balancing network connecting the common terminal of said first and second transistors to the common terminal of said third transistor and said resistive means.

9. The line interface as defined by claim 5 or 8, and further including ring means for overriding said first modulator means and applying a ring signal to said subscriber.

10. The line interface as defined by claim 9 wherein said ring means includes means for controlling said first and second switch means at approximately full duty cycle for applying maximum power to said subscriber.

11. The line interface as defined by claim 10 wherein said ring means further includes third and fourth switch means for alternately connecting end terminals of said second winding to said subscriber.

12. The line interface as defined by claim 11 wherein said third and fourth switch means comprise photo activated semiconductor devices, said ring means further including means for alternately activating said photo activated semiconductor devices.

* * * * *